US011900281B2

(12) United States Patent
de Oliveira et al.

(10) Patent No.: US 11,900,281 B2
(45) Date of Patent: Feb. 13, 2024

(54) SYSTEMS AND METHODS FOR OPTIMIZING ENERGY LOADING IN AIRLINE OPERATIONS

(71) Applicant: The Boeing Company, Chicago, IL (US)

(72) Inventors: Italo Romani de Oliveira, Sao Jose dos Campos (BR); Francisco A. Navarro, Lucerne (CH); Onofre Andrade, Sao Jose dos Campos (BR)

(73) Assignee: The Boeing Company, Chicago, IL (US)

( * ) Notice: Subject to any disclaimer, the term of this patent is extended or adjusted under 35 U.S.C. 154(b) by 510 days.

(21) Appl. No.: 16/591,897

(22) Filed: Oct. 3, 2019

(65) Prior Publication Data

US 2021/0103860 A1 Apr. 8, 2021

(51) Int. Cl.
*G06Q 10/04* (2023.01)
*G06Q 50/30* (2012.01)
(Continued)

(52) U.S. Cl.
CPC ............. *G06Q 10/04* (2013.01); *G06Q 50/30* (2013.01); *G08G 5/003* (2013.01); *G08G 5/0013* (2013.01); *G06N 20/00* (2019.01)

(58) Field of Classification Search
CPC .. G08G 5/0039; G08G 5/0034; G08G 5/0043; G08G 5/0021; G06Q 10/04;
(Continued)

(56) References Cited

U.S. PATENT DOCUMENTS

2013/0197791 A1* 8/2013 Struzik ................. G06Q 50/30
701/123
2018/0189704 A1* 7/2018 Kumar ............ G06Q 10/06315
(Continued)

FOREIGN PATENT DOCUMENTS

FR 3090174 A1 * 6/2020 ............. G01C 21/20

OTHER PUBLICATIONS

S. Baumann, "Using Machine Learning for Data-Based Assessing of the Aircraft Fuel Economy," 2019 IEEE Aerospace Conference, Big Sky, MT, USA, 2019, pp. 1-13. <https://ieeexplore.ieee.org/document/8742011?source=IQplus> (Year: 2019).*
(Continued)

*Primary Examiner* — Jerry O'Connor
*Assistant Examiner* — Michael R Koester
(74) *Attorney, Agent, or Firm* — McDonnell Boehnen Hulbert & Berghoff LLP

(57) ABSTRACT

In an example, a method for optimizing energy loading in airline operations is described. The method includes receiving a flight plan of an aircraft indicative of a plurality of landing sites and a corresponding plurality of flight legs. The method includes determining an energy load of the aircraft associated with each flight leg. The energy load corresponds to an amount of fuel used during the flight leg. The method includes calculating a fuel value score for refueling the aircraft at a landing site of each flight leg. The fuel value score relates to a refueling estimate at the landing site and a time for refueling at the landing site. The method includes determining a fueling plan based at least on the energy load of the aircraft at each flight leg and the fuel value score for refueling the aircraft at the landing site of each flight leg.

20 Claims, 12 Drawing Sheets

(51) Int. Cl.
*G08G 5/00* (2006.01)
*G06N 20/00* (2019.01)

(58) Field of Classification Search
CPC ...... B64D 45/00; G01C 23/00; G01C 23/005; G01C 21/20; G01C 21/00; B64C 39/024
See application file for complete search history.

(56) References Cited

U.S. PATENT DOCUMENTS

| | | | |
|---|---|---|---|
| 2019/0108466 A1* | 4/2019 | Khan | G08G 5/0039 |
| 2020/0320446 A1* | 10/2020 | Dahl | G06Q 10/025 |
| 2020/0342771 A1* | 10/2020 | Mohan | G08G 5/0091 |
| 2020/0355519 A1* | 11/2020 | Shamasundar | G08G 5/0021 |
| 2021/0009282 A1* | 1/2021 | Long | B64D 45/00 |

OTHER PUBLICATIONS

M. Uzun et al., "Deep Learning Techniques for Improving Estimations of Key Parameters for Efficient Flight Planning," 2019 IEEE/AIAA 38th Digital Avionics Systems Conference (DASC), San Diego, CA, USA, 2019, pp. 1-8. <https://ieeexplore.ieee.org/document/9081804?source=IQplus> (Year: 2019).*

* cited by examiner

SYSTEMS AND METHODS FOR OPTIMIZING ENERGY LOADING IN AIRLINE OPERATIONS

FIELD

The present disclosure relates generally to airline operations. In particular, the present disclosure relates to optimizing energy loading for a fleet of aircraft by determining fueling plans for aircraft in the fleet of aircraft.

BACKGROUND

Refueling and flight planning are major considerations in airline operations. It is important to ensure that each aircraft has enough fuel to travel from landing site to landing site. In addition, aircraft should refuel in accordance with a flight plan to allow passengers and cargo to arrive at each destination in a timely manner. Still further, refueling aircraft should be carried out in a timely and emission-reducing manner. However, landing sites have idiosyncrasies that make planning to refuel aircraft difficult and largely dependent on situational contexts such as time of day, airport congestion, weather, maintenance schedules, and so on. Accordingly, it is desirable to effectively plan for refueling operations in view of relevant information.

Aircraft, like other vehicles, are being designed for reducing emissions. This involves the use of alternative fuels, such as battery-powered or hybrid aircraft, eco-fuels, biofuels and the like. Each of these fuel types may have unique energy loading capabilities for a given aircraft type. Accordingly, it is desirable to design fuel plans that account for fuel types and aircraft types when determining a fueling plan of a fleet of aircraft.

What is needed is a system for adaptively determining fuel plans that coordinate with flight plans of a fleet of aircraft, situational contexts, fuel types, and aircraft types.

SUMMARY

In an example, a method for optimizing energy loading in airline operations is described. The method includes receiving a flight plan of an aircraft indicative of a plurality of landing sites and a corresponding plurality of flight legs, wherein each landing site corresponds to a set of fuel-related parameters, and wherein each set of fuel-related parameters comprises at least (i) a landing site location, (ii) an available fuel type, (iii) an expected fuel cost, and (iv) an emission standard. The method includes determining, based on (i) the set of fuel-related parameters for each landing site and (ii) an expected payload for each flight leg, an energy load of the aircraft associated with each flight leg, wherein the energy load corresponds to an amount of fuel used during the flight leg. The method includes calculating a fuel value score for refueling the aircraft at a landing site of each flight leg, wherein the fuel value score relates to a refueling estimate at the landing site and a time for refueling at the landing site. The method includes determining a fueling plan corresponding to the flight plan based at least on the energy load of the aircraft at each flight leg of the flight plan and the fuel value score for refueling the aircraft at the landing site of each flight leg of the flight plan. The method includes fueling the aircraft by a particular amount at a first landing site of the flight plan in accordance with the fueling plan.

In another example, a system for optimizing energy loading in airline operations is described. The system includes a computing device having a processor and a memory having instructions executable by the processor to perform a set of functions. The set of functions includes receiving flight plans of a plurality of aircraft in a fleet of aircraft, wherein each flight plan is indicative of a plurality of landing sites and a corresponding plurality of flight legs, wherein each landing site corresponds to a set of fuel-related parameters, and wherein each set of fuel-related parameters comprises at least (i) a landing site location, (ii) an available fuel type, (iii) an expected fuel cost, and (iv) an emission standard. The set of functions includes, for each aircraft of the plurality of aircraft, determining, based on (i) the set of fuel-related parameters for each landing site and (ii) an expected payload for each flight leg, an energy load of the aircraft associated with each flight leg, wherein the energy load corresponds to an amount of fuel used during the flight leg, calculating a fuel value score for refueling the aircraft at a landing site of each flight leg, wherein the fuel value score relates to a refueling estimate at the landing site and a time for refueling at the landing site, determining a fueling plan corresponding to the flight plan based at least on the energy load of the aircraft at each flight leg of the flight plan and the fuel value score for refueling the aircraft at the landing site of each flight leg of the flight plan, and providing the fueling plan to the aircraft.

In another example, a non-transitory computer readable medium is described. The non-transitory computer readable medium has stored thereon instructions, that when executed by one or more processors of a computing device, cause the computing device to perform functions. The functions include receiving a flight plan of an aircraft indicative of a plurality of landing sites and a corresponding plurality of flight legs, wherein each landing site corresponds to a set of fuel-related parameters, and wherein each set of fuel-related parameters comprises at least (i) a landing site location, (ii) an available fuel type, (iii) an expected fuel cost, and (iv) an emission standard. The functions include determining, based on (i) the set of fuel-related parameters for each landing site and (ii) an expected payload for each flight leg, an energy load of the aircraft associated with each flight leg, wherein the energy load corresponds to an amount of fuel used during the flight leg. The functions include calculating a fuel value score for refueling the aircraft at a landing site of each flight leg, wherein the fuel value score relates to a refueling estimate at the landing site and a time for refueling at the landing site. The functions include determining a fueling plan corresponding to the flight plan based at least on the energy load of the aircraft at each flight leg of the flight plan and the fuel value score for refueling the aircraft at the landing site of each flight leg of the flight plan. The functions include fueling the aircraft by a particular amount at a first landing site of the flight plan in accordance with the fueling plan.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods optimizing energy loading in airline operations are described. In particular, systems and methods for determining fueling plans that correspond to flight plans are described.

Example systems and methods involve use known flight conditions and operational conditions and predicted flight conditions and operational conditions to determine fuel plans for a fleet of aircraft. This involves monitoring relevant parameters for refueling the aircraft (e.g., expected payloads, weather conditions, etc.) and rating different landing sites with regard to their desirability for refueling at a given time. Further, determining the refueling plan may take into account which fuel types are available to a given aircraft and which have better emissions ratings. As aircraft are designed to accommodate more fuel types (e.g., alternative fuels, such as electricity) and different jurisdictions implement associated emissions standards, optimizing energy loading can reduce the carbon footprint of an aircraft while simultaneously reducing time required to refuel the aircraft and costs associated with refueling the aircraft.

Within examples, for a given aircraft, a fueling plan is updated throughout a flight plan. This allows current information and updated predictions to be considered at each point of the flight plan, allowing for quick adjustments to the plan. For example, conditions updated and considered during the flight plan may include (i) notices to airmen (NOTAMs), weather information, (ii) gate availability at airports, (iii) logistic constraints (e.g., fuel type availability, maintenance considerations, etc.), (iv) airport traffic, (v) fuel availability and value, (vi) in-flight delays, (vii) ground delays, (viii) estimated times of arrival (ETAs) and estimated times of departure (ETDs), (ix) remaining fuel, and other flight and operational conditions. Determining updated fueling plans in view of these considerations allows for robust fueling solutions that are not completely dependent on initial estimates.

Figure 1:
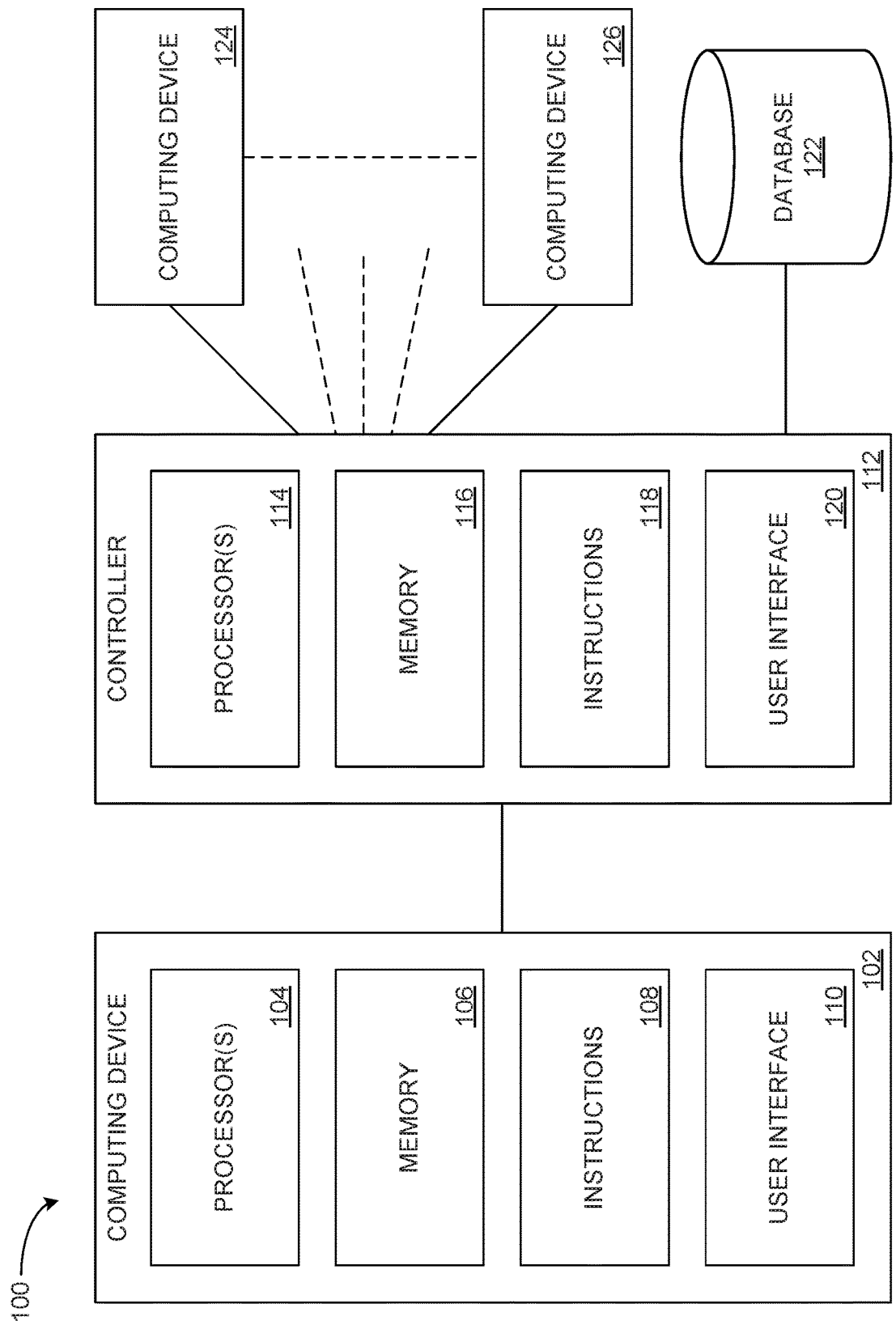
FIG. 1 illustrates a block diagram of a system for optimizing energy loading in airline operations, according to an example implementation.

Turning now to the figures, FIG. 1 illustrates a block diagram of a system 100 for optimizing energy loading in airline operations, according to an example implementation. In particular, FIG. 1 shows a computing device 102 associated with an aircraft that can interact with a controller 112 of the system 100. Within examples, the computing device 102 is included within the aircraft. In alternative examples, the computing device 102 is located at a landing site (e.g., an airport) and is used for providing details related to the aircraft and receiving instructions related to the aircraft.

The controller 112 interacts with, and sends control instructions to the computing device 102, as well as a plurality of computing devices associated with a fleet of aircraft. For purposes of illustration, a computing device 124 and a computing device 126 are depicted as being connected to the controller 112, though additional computing devices are not depicted. For purposes of simplicity, the computing device 102 is described in relation to the system 100. However, the computing device 124, the computing device 126, or any other computing devices of the fleet can interact with the controller 112 in a similar manner to the computing device 102. The system 100 further includes a database 122, which can include information related to the fleet of aircraft and known flight conditionals and operational conditions associated with the fleet of aircraft.

The computing device 102 includes one or more processor(s) 104, a memory 106, instructions 108, and a user interface 110. The one or more processor(s) 104 may be general-purpose processors or special purpose processors (e.g., digital signal processors, application specific integrated circuits, etc.). The one or more processor(s) 104 can be configured to execute the instructions 108 (e.g., computer-readable program instructions) that are stored in the memory 106 and are executable to provide the functionality of computing device 102, and related systems and methods described herein.

The memory 106 may include or take the form of one or more computer-readable storage media that can be read or accessed by the processor(s) 104. The computer-readable storage media can include volatile and/or non-volatile storage components, such as optical, magnetic, organic or other memory or disc storage, which can be integrated in whole or in part with the processor(s) 104. The memory 106 is considered non-transitory computer readable media. In some examples, the memory 106 can be implemented using a single physical device (e.g., one optical, magnetic, organic or other memory or disc storage unit), while in other examples, the memory 106 can be implemented using two or more physical devices. The memory 106 thus is a non-transitory computer readable storage medium, and instructions 108 executable by the processor(s) 104 are stored on the memory 106. The instructions 108 include computer executable code.

The user interface 110 may include or take the form of a keyboard, a mouse, a touchscreen, a microphone, a gesture recognition system, a combination thereof, or another means of receiving user input by the computing device 102. The user interface can be integrated into the computing device 102 as depicted in FIG. 1 or be included in another subsystem or device. Though the examples below are generally described as pertaining to use of a touchscreen, other interfaces are possible.

As described in greater detail below, the instructions 108 may be executed by the processor(s) 104 to receive inputs from the user interface 110 indicative of one or more details related to a fueling plan for an aircraft associated with the computing device 102 and to provide these details to the controller 112. For example, the inputs may relate to an amount of fuel intake by the aircraft at a given airport, a fuel cost, a time taken for refueling, and the like. Within examples, some of this information is received manually via the user interface 110 and some information is received automatically from other computing devices.

The controller 112 includes processor(s) 114, a memory 116, instructions 118, and a user interface 120. The processor(s) 114 may be configured similarly to the processor(s) 104, the memory 116 may be configured similarly to the memory 106, and the user interface 120 may be configured similarly to the user interface 110. The instructions 118 are stored on the memory 116 and are executable by the processor(s) 114 to perform functions. Thus, the controller 112 is another computing device of the system 100. Within examples, the controller 112 may use information received from the computing device 102 and the plurality of computing devices to determine a fueling plan for the aircraft associated with the computing device 102. Further description of how the controller determines fueling plans for the aircraft are provided below.

The database 122 may include representations of sets of fuel-related parameters corresponding to each landing site in a network of landing sites associated with the fleet of aircraft. These fuel related parameters may include (i) a landing site location, (ii) an available fuel type, (iii) an expected fuel cost, and (iv) an emission standard, among other parameters. The database 122 may further include details (e.g., payload minimum and payload maximum values) regarding different types of aircraft and different types of fuels (e.g., energy densities of each fuel type). The database 122 may be part of a larger system for managing data of the fleet of aircraft. The controller 112 may interact with the database 122 to determine fueling plans for the fleet of aircraft, as described further below.

Figure 2:
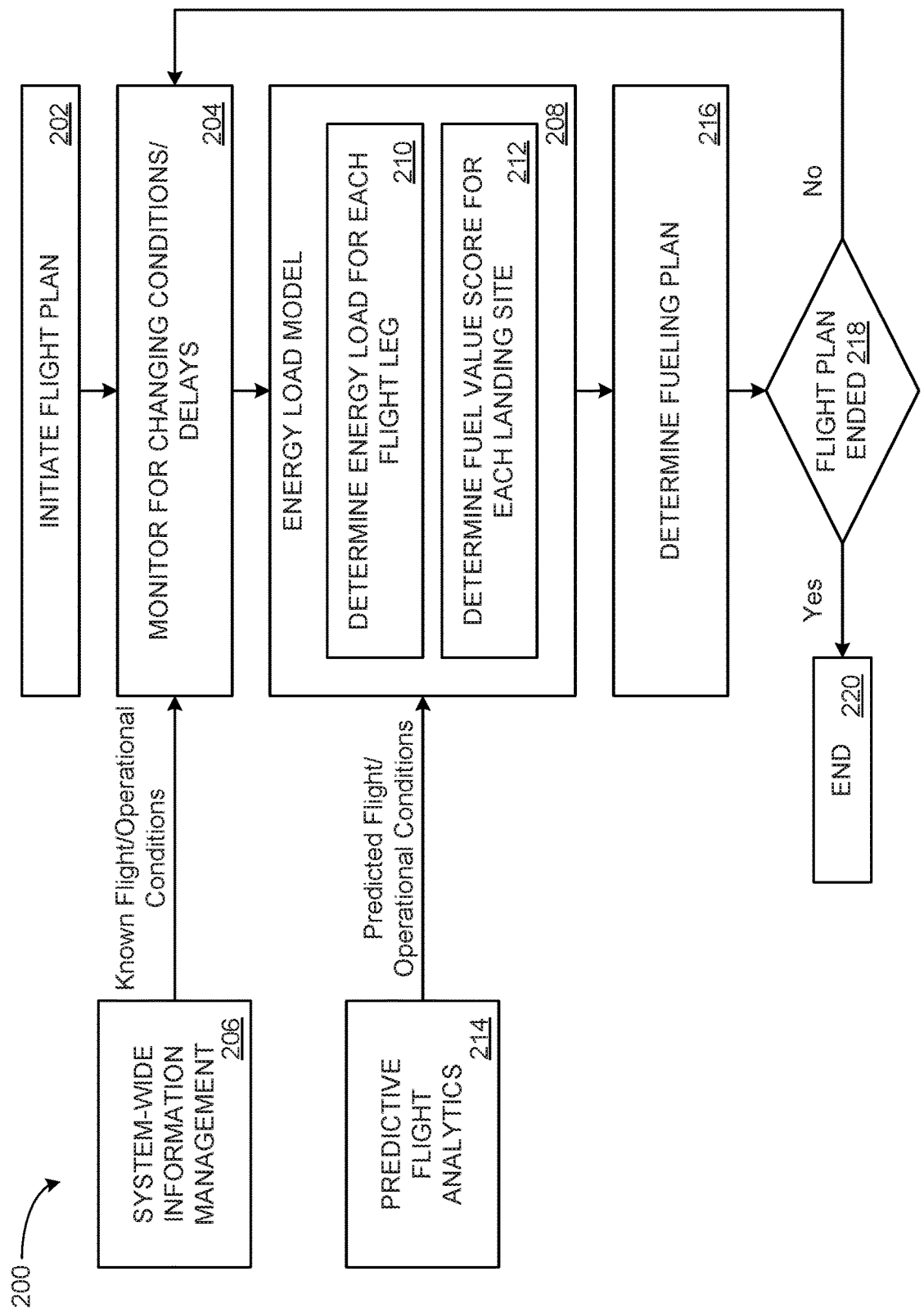
FIG. 2 illustrates a block diagram of a method for optimizing energy loading in airline operations, according to an example implementation.

FIG. 2 illustrates a block diagram of a method 200 for optimizing energy loading in airline operations, according to an example implementation. At block 202, the method 200 involves initiating a flight plan for an aircraft. As used herein, the term "flight plan" may refer to a sequence of landing sites, and landing and departure times corresponding to each landing site. Initiating the flight plan may include tracking progress of an aircraft from an initial departure site of the flight plan. For purposes of example, the functions described in relation to FIG. 2 can be carried out by the controller 112, or a combination of the controller 112 and other computing devices, such as the computing device 102.

At block 204, the method 200 involves monitoring for changing conditions or delays associated with the flight plan. This includes receiving known flight conditions and known operational conditions associated with the flight plan. For example, at block 206, the method 200 may involve using system-wide information management for determining and providing these conditions for use at block 204. These known flight conditions and operational conditions and predicted flight conditions and operational conditions to determine fuel plans for a fleet of aircraft. Within examples, such information may include (i) notices to airmen (NOTAMs), weather information, (ii) gate availability at airports, (iii) logistic constraints (e.g., fuel type availability, maintenance considerations, etc.), (iv) airport traffic, (v) fuel availability and value, (vi) in-flight delays, (vii) ground delays, (viii) estimated times of arrival (ETAs) and estimated times of departure (ETDs), (ix) remaining fuel, and other flight and operational conditions. These conditions may be derived from information received from a plurality of aircraft in a fleet of aircraft and from other sources, such as the database 122, the computing device 102, air traffic controllers, and other sources of information related to flight plans and landing sites associated with the fleet of aircraft.

From the information received at block 204, fuel-related parameters can be determined for each flight leg of the flight plan. Each set of fuel-related parameters includes at least (i) a landing site location (e.g., coordinates of an airport), (ii) an available fuel type (e.g., types of fossil fuels, bio-fuels, eco-fuels, alternative fuels, etc. available at the airport), (iii) an expected fuel cost (e.g., a time cost and a price associated with each available fuel type), and (iv) an emission standard (e.g., an expected emission rating of travel to and from the airport). Accordingly, the fuel-related parameters may collectively indicate a time and cost associated with refueling at a particular location based on known conditions.

At block 208, the method 200 involves determining an energy load model for the aircraft, which includes functions in blocks 210 and 212. At block 210, functions include determining an energy load for each flight leg, and at block 212, functions include determining a fuel value score for the aircraft at each landing site in the flight plan.

At block 214, functions include determining predictive flight analytics for the aircraft, which are provided at block 208 in the form of predicted flight conditions (e.g., headwinds, weather, and the like) and operational conditions (e.g., route adjustments, NOTAMs, expected passenger count and/or cargo payload, expected in-air delays, and the like) relevant to one or more flight legs of the aircraft. Determining predictive flight analytics at block 214 may include predicting aspects of a flight leg using data received from multiple sources over time to form expectations about future conditions. In some examples, this may include training a machine learning model with a training set of data corresponding to multiple flight condition parameters and operational condition parameters, providing current data as an input to the trained machine learning model, and receiving an output from the trained machine learning model that indicates future values of one or more flight and operational conditions. Within examples, determining predictive flight analytics includes aggregating data that predicts such future values, such as weather forecasts, operational characteristics of each landing site at particular times of day, and the like. The machine learning model may be implemented using a computing device, such as a machine learning device specifically configured for machine learning operations (e.g., a server configured for implementing a neural network).

Determining an energy load for the aircraft involves determining an expected payload associated with flight leg, which accounts for a weight of the aircraft, expected passenger count, and a corresponding expected cargo payload. This allows for a more accurate determination of the expected energy load, which relates to how much energy is required to transport the aircraft during a given flight leg. Other considerations received from block 214 are relevant as well. For example, a headwind or turbulent weather conditions may cause the aircraft to expend extra energy in reaching a landing site, and an expected delay (e.g., either due to idling while navigating to a runway or landing dock or performing a holding pattern while waiting to land the aircraft) may cause additional expenditure of energy. Different fuel levels also are considered in this context, since more fuel adds to the weight of the aircraft, and burning fuel during flight reduces that weight. This may be particularly relevant where the aircraft is refueled at a first landing site, but not refueled again for several flight legs. Taking such factors into account, in addition to the payload, allows for a more accurate determination of the expected payload, which in turn relates to how much fuel will be needed to complete a flight leg.

Calculating a fuel value score for refueling the aircraft at each landing site relates to providing a relative need and/or benefit of refueling at each landing site. For example, a high fuel score may correspond to an airport with low wait times prior to fueling, low fueling times, several available fuel types, low-cost fuels, and permissive emissions ratings. These factors would indicate that the airport is a desirable place to refuel the aircraft. If, however, each airport in the flight plan has similar qualities, refueling may be an arbitrary factor that relates more to need (i.e., a fuel level of an aircraft in view of the expected energy load for a given flight leg). The fuel value score may thus weigh a refueling estimate (e.g., fuel amount and associated emissions cost, such as a carbon footprint) and a time for refueling the aircraft at each landing site. As a further consideration for aircraft that can use more than one fuel type or that include hybrid technology, the fuel value score may relate to an availability of certain fuel types. Landing sites having more available fuel types suitable for a given aircraft may be rated more highly. Determining the fuel value score may involve using a cost function that promotes (i) a reduced refueling estimate and (ii) a reduced time for refueling at the landing site. Because calculating the fuel value score may involve a cost function and/or a machine learning model, fuel value scores may not fall within a defined range. Thus, within examples, the scores may be normalized (i.e., fall within a range of 0 and 1) such that the top score among landing sites is equal to 1 and the lowest score is equal to 0. In these examples, landing sites with scores greater than a threshold value (e.g., 0.8) can be considered "high" fuel value scores that are prioritized for purposes of fueling the aircraft, while other landing sites might only considered if prioritized landing sites do not meet other constraints (e.g., providing enough fuel to meet an energy load for each flight leg).

At block 216, the method 200 involves determining a fueling plan for the aircraft. The fueling plan may be determined based on expected energy loads and fuel value scores for each landing site in the flight plan, and is optimized for reducing time spent fueling while reducing fuel costs (including associated emissions costs). More details regarding this step are provided below.

After block 216, method 200 involves determining, at block 218, whether the flight plan has ended (i.e., whether the aircraft has reached its final landing site). If "yes," then the method 200 ends at block 220. If "no," then the method cycles again at block 204. In this manner, the method 200, in conjunction with associated systems and devices, may update as an aircraft progresses through the flight plan, as flight conditions and operational conditions (both known and predicted) change during the course of the flight plan. Iteratively determining the fueling plan in this manner ensures that lower fueling times and fuel-related costs are achieved. Further, performing these functions across an entire fleet of aircraft assists in optimizing energy loads in a manner that can reduce emissions and promote use of alternative fuels (e.g., electricity).

Figure 3:
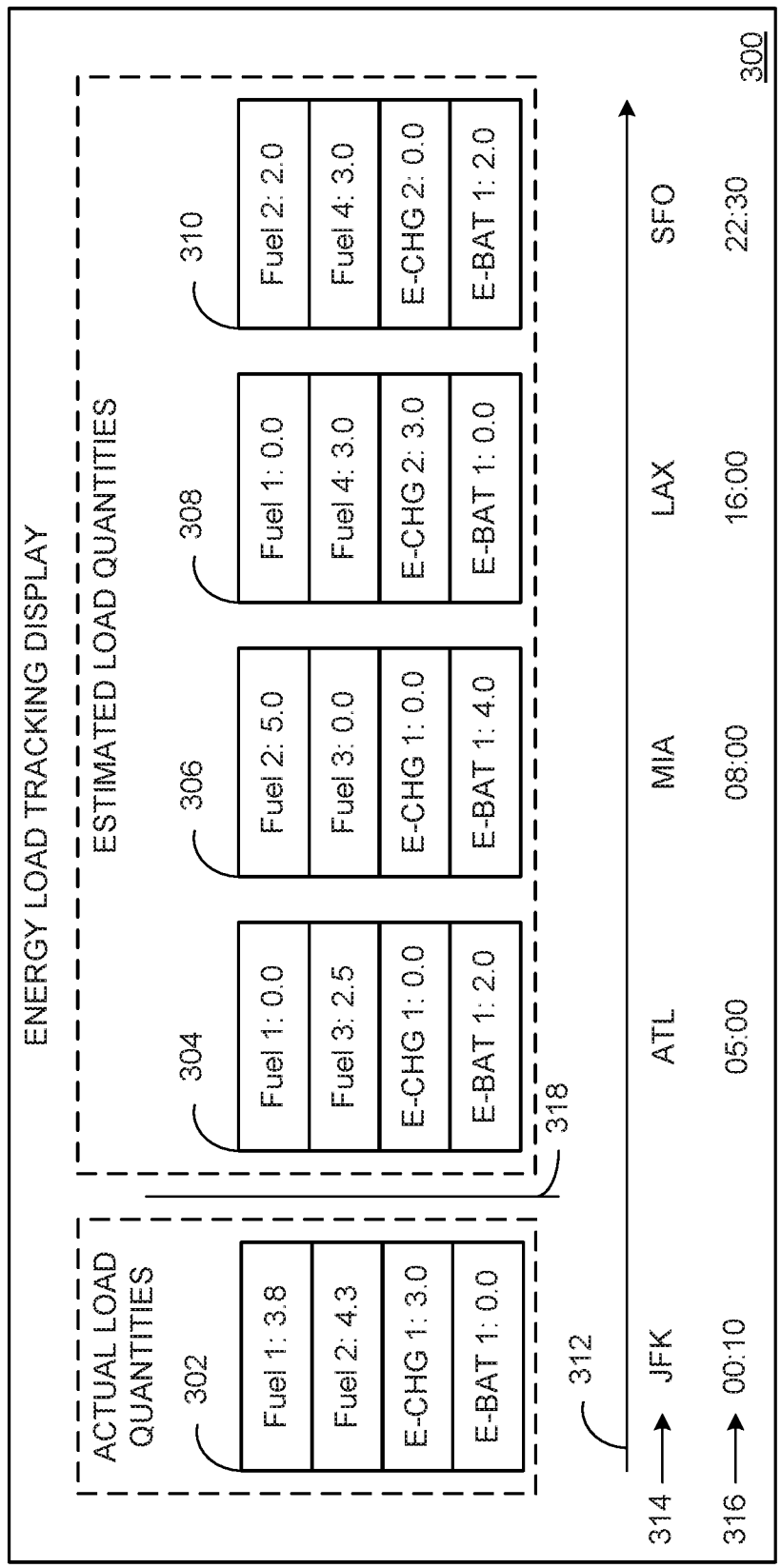
FIG. 3 illustrates a user interface having an energy loading tracking display for optimizing energy loading in airline operations, according to an example implementation.

FIG. 3 illustrates a user interface 300 having an energy loading tracking display for optimizing energy loading in airline operations, according to an example implementation. In particular, FIG. 3 shows actual and estimated load quantities for an aircraft while executing a flight plan. The user interface 300 may be used to allow a user to track aspects of the flight plan and to interact with the fueling plan by selecting or altering various energy load values. Within examples, the user interface may be implemented as part of a dispatching system for a fleet of aircraft.

As shown in FIG. 3, the user interface 300 includes a set of actual load quantities 302, a first set of estimated load quantities 304, a second set of estimated load quantities 306, a third set of estimated load quantities 308, and a fourth set of estimated load quantities 310. These load quantities are displayed sequentially along a flight plan timeline 312.

The set of actual load quantities 302 corresponds to fuel types and relative quantities of each fuel type in the aircraft in a current state (i.e., while executing a current flight leg). In the present example "Fuel 1" (e.g., a fossil-fuel-based jet fuel) has a relative load of 3.8. This may correspond to a relative fuel level relative to a maximum fuel level for the aircraft (e.g., 5.0). Accordingly, this may indicate that Fuel 1 is 76% full. "Fuel 2" (e.g., a fossil-fuel-based jet fuel containing ethanol) has a relative load of 4.3. "E-CHG 1" (e.g., a first charge-based alternative fuel, such as a super capacitor) has a relative load of 3.0. "E-BAT 1" (e.g., a first battery-based fuel, such as a lithium-ion battery array) has a relative load of 0.0. The set of actual load quantities 302 may be received from the aircraft as it travels.

The user interface 300 further includes a landing site tracker 314 showing each airport in the flight plan (e.g. airport codes JFK, ATL, MIA, LAX, and SFO) and a time tracker 316 showing actual and estimated departure times from each airport. Also depicted is a status bar 318 indicating which load quantities are current and which are estimated future quantities based on a current fueling plan for the aircraft. In the present example, the status bar 318 indicates that the actual load quantities 302 are current and the other displayed load quantities are estimated.

A user may select and alter estimated load quantities in accordance with specialized information. For example, an emission standard at a particular location may change causing a particular fuel type to become less desirable (e.g., "Fuel 3" may correspond to emissions that are higher than an emission standard in California. Accordingly, prior to reaching LAX, a user can reset a fuel load from "Fuel 3" to 0.0, rather than refueling at MIA. This is reflected in the second set of estimated load quantities 306. These manual inputs can be tracked by a computing device (e.g., the controller 112) and serve as test data for a machine learning model used for determining the fueling plan. In other examples, these inputs can be tracked and set as restrictive parameters for future iterations of fueling plans. In this manner, the system can quickly adapt to changes in fuel-related parameters.

The user interface 300 depicted in FIG. 3 includes several fuel types in relation to a particular aircraft. It should be understood that these fuel types are provided for exemplary purposes, and that in practice an aircraft might only be capable of using a few different fuel types.

Figure 4:
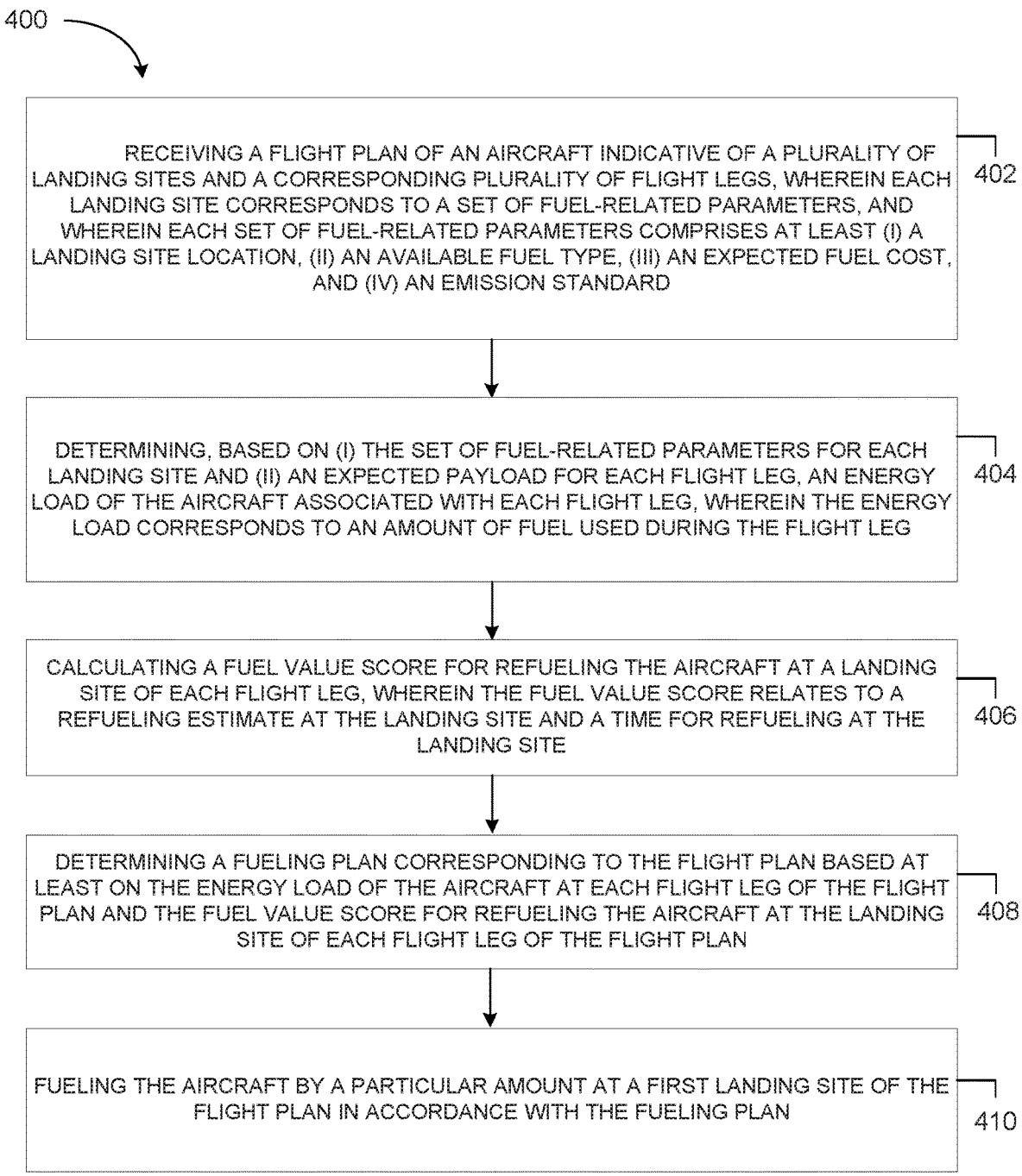
FIG. 4 illustrates a flowchart of a method for optimizing energy loading in airline operations, according to an example implementation.

FIG. 4 illustrates a flowchart of a method 400 for optimizing energy loading in airline operations, according to an example implementation. Method 400 shown in FIG. 4 presents an example of a method that could be used with the system 100 shown in FIG. 1, the method 200 shown in FIG. 2, the user interface 300 shown in FIG. 3, a combination thereof or with components of thereof. Further, the functions described with respect to FIG. 4 may be supplemented by, replaced by, or combined with functions described above with respect to FIGS. 1, 2, and 3. Further, devices or systems may be used or configured to perform logical functions presented in FIG. 4.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-410. Further, blocks 412-478 of the method 400 may be performed in accordance with one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 4, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes receiving a flight plan of an aircraft indicative of a plurality of landing sites and a corresponding plurality of flight legs. For example, each landing site may correspond to an airport and each flight leg corresponds to a connecting flight between two landing sites. Within these examples, each landing site corresponds to a set of fuel-related parameters, which include at least (i) a landing site location (e.g., coordinates of an airport), (ii) an available fuel type (e.g., fossil-based fuels, eco-fuels, bio-fuels, alternative fuels such as electricity-based technologies, or the like), (iii) an expected fuel cost (e.g., a price per Watt or other measure of energy density values), and (iv) an emission standard (e.g., a maximum carbon footprint rating for incoming flights set by a jurisdiction for each landing site).

At block 404, the method 400 includes determining, based on (i) the set of fuel-related parameters for each landing site and (ii) an expected payload for each flight leg, an energy load of the aircraft associated with each flight leg. The energy load corresponds to an amount of fuel used during the flight leg, and can be based on a weight of the aircraft, expected passenger count, and a corresponding expected cargo payload, among other factors. In addition, flight conditions (e.g., headwinds and/or expected weather conditions) may be accounted for in determining the expected energy load.

At block 406, the method 400 includes calculating a fuel value score for refueling the aircraft at a landing site of each flight leg. The fuel value score relates to a refueling estimate at the landing site and a time for refueling at the landing site. For example, the score may relate to a cost function that promotes shorter refueling times and less fuel-related costs (e.g., emissions costs). In other examples, the fuel value score may be an output of a trained machine learning model. Accordingly, the scores may not fall within a defined range. Thus, within examples, the scores may be normalized (i.e., fall within a range of 0 and 1) such that the top score among landing sites is equal to 1 and the lowest score is equal to 0. In these examples, landing sites with scores greater than a threshold value (e.g., 0.8) can be prioritized for purposes of fueling the aircraft, while other landing sites might only considered if prioritized landing sites do not meet other constraints (e.g., providing enough fuel to meet an energy load for each flight leg).

At block 408, the method 400 includes determining a fueling plan corresponding to the flight plan based at least on the energy load of the aircraft at each flight leg of the flight plan and the fuel value score for refueling the aircraft at the landing site of each flight leg of the flight plan. Within examples, the fueling plan may include a set of landing sites corresponding to the flight plan (perhaps a subset of the landing sites), a type or types of fuel for refueling the aircraft at each landing site in the set of landing sites, and an amount of each fuel type for refueling the aircraft at each landing site. Within examples, the refueling plan may use the energy load as a constraint of the fueling plan, such that the minimum amount of fuel in the aircraft at a given landing site is greater than the energy load for a corresponding flight leg (perhaps with an additional predetermined buffer added to account for potential rerouting and delays). Meanwhile, the fuel value score may promote refueling at certain landing sites while dissuade refueling at others. A cost function or machine learning model may be utilized to automatically select refueling amounts for the fueling plan at each landing site. As noted above with respect to FIG. 2, this determination may be made iteratively as the aircraft progresses along flight legs of the flight plan to ensure accurate fuel estimates as conditions change.

At block 410, the method 400 includes fueling the aircraft by a particular amount at a first landing site of the flight plan in accordance with the fueling plan. For example, the aircraft may be fueled using one or more load quantities set by the fueling plan. Using the user interface 300 depicted in FIG. 3 as an example, this may correspond to fueling the aircraft to a load quantity of 2.5 for "Fuel 3" and fueling the aircraft to a load quantity of 2.0 for "E-BAT 1."

Figure 5:
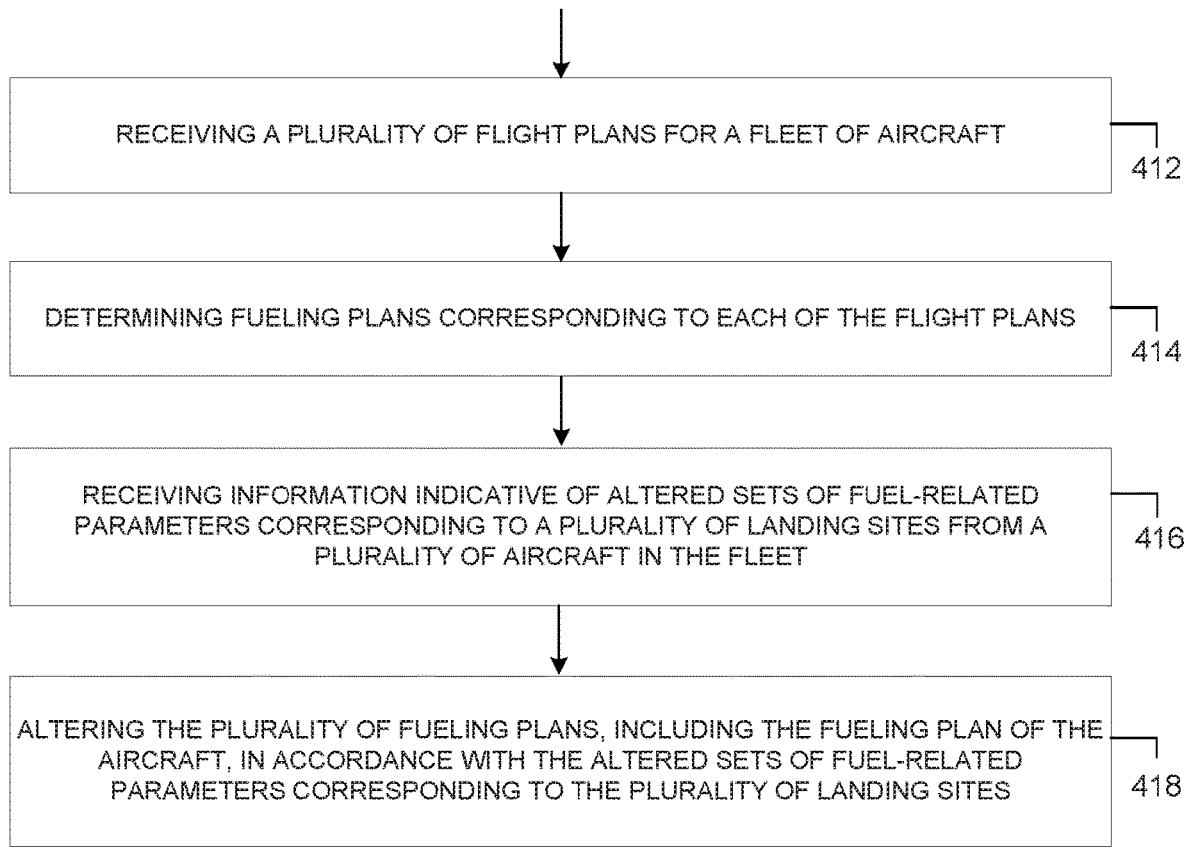
FIG. 5 illustrates a flowchart of a method for use with the method shown in FIG. 4, according to an example implementation.

FIG. 5 illustrates a flowchart of a method for use with the method 400 shown in FIG. 4, according to an example implementation. In particular, FIG. 5 depicts the method 400 including block 412-418. At block 412, the method 400 includes receiving a plurality of flight plans for a fleet of aircraft. At block 414, the method 400 includes determining fueling plans corresponding to each of the flight plans. This may be performed in a similar manner as described above with respect to a single aircraft. At block 416, the method 400 includes receiving information indicative of altered sets of fuel-related parameters corresponding to a plurality of landing sites from a plurality of aircraft in the fleet. For example, this may involve receiving information about operational conditions of a given airport (e.g., aircraft traffic, NOTAMs, flight delays, or the like). At block 418, the method 400 includes altering the plurality of fueling plans, including the fueling plan of the aircraft, in accordance with the altered sets of fuel-related parameters corresponding to the plurality of landing sites. In this manner, a computing device (e.g., the controller 112) may quickly update refueling plans for a plurality of aircraft based on a change to a single landing location.

Figure 6:
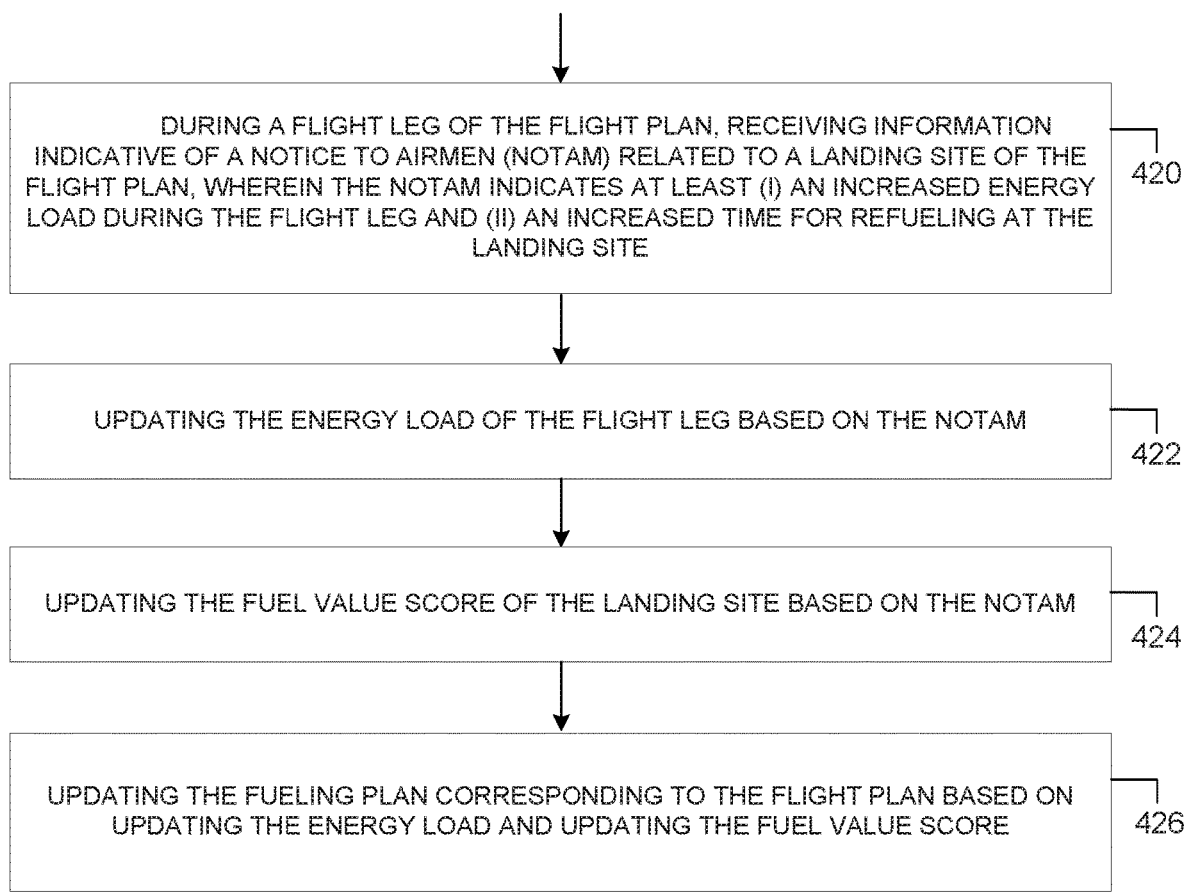
FIG. 6 illustrates a flowchart of a method for use with the method shown in FIG. 4, according to an example implementation.

FIG. 6 illustrates a flowchart of a method for use with the method 400 shown in FIG. 4, according to an example implementation. In particular, FIG. 6 depicts the method 400 including block 420-426. At block 420, the method 400 includes, during a flight leg of the flight plan, receiving information indicative of a notice to airmen (NOTAM) related to a landing site of the flight plan. The NOTAM indicates at least (i) an increased energy load during the flight leg and (ii) an increased time for refueling at the landing site. For example, all NOTAMs for landing sites in the flight plan may be stored in the database 122 and accessed by the controller 112. At block 422, the method 400 includes updating the energy load of the flight leg based on the NOTAM. At block 424, the method 400 includes updating the fuel value score of the landing site based on the NOTAM. At block 426, the method 400 includes updating the fueling plan corresponding to the flight plan based on updating the energy load and updating the fuel value score. Thus, as described more generally above, a NOTAM that effects one or more conditions of a landing site may result in an updated energy load for the aircraft, fuel value score of a landing site, and a correspondingly updated fueling plan. Other updates to flight conditions or operational conditions (either known or predicted) can similarly influence the fueling plan.

Figure 7:
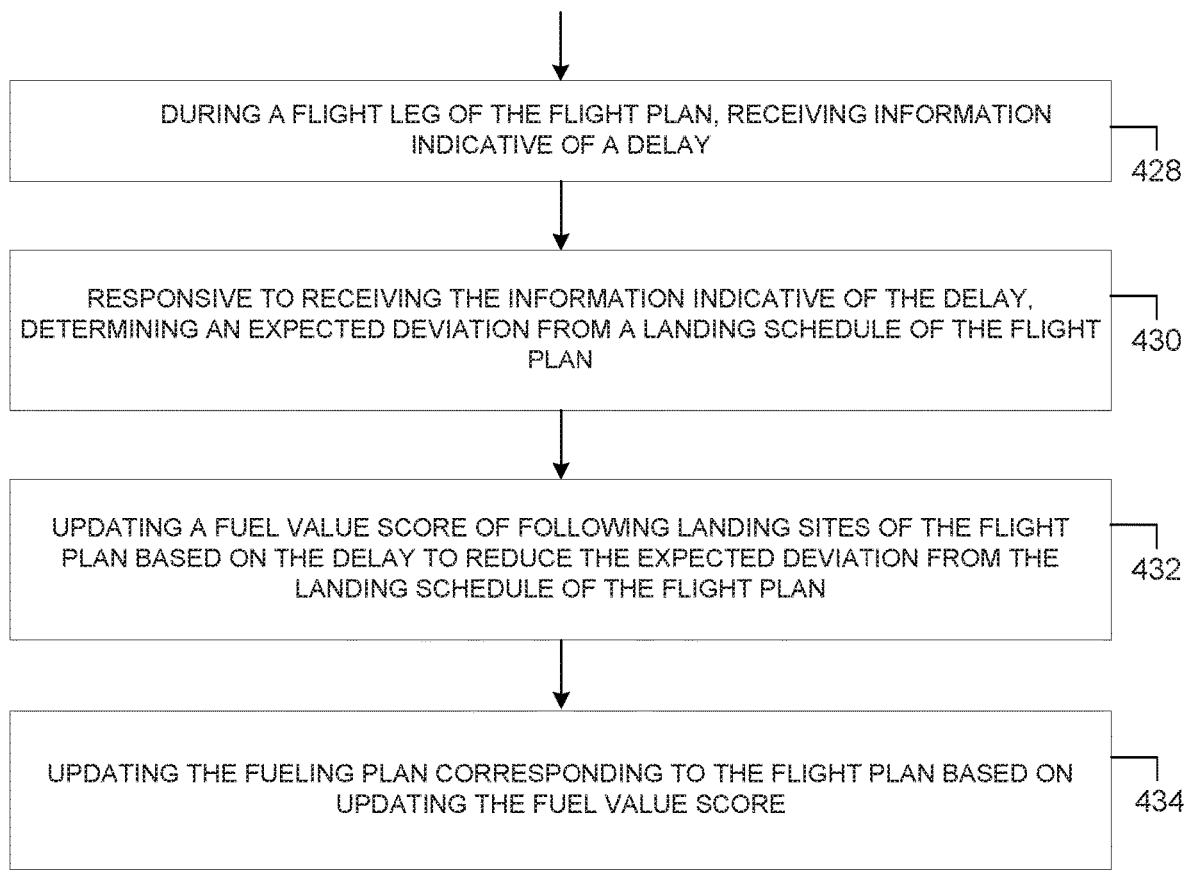
FIG. 7 illustrates a flowchart of a method for use with the method shown in FIG. 4, according to an example implementation.

FIG. 7 illustrates a flowchart of a method for use with the method shown in FIG. 4, according to an example implementation. In particular, FIG. 7 depicts the method 400 including block 428-434. At block 428, the method 400 includes, during a flight leg of the flight plan, receiving information indicative of a delay (e.g., a delay in landing the aircraft at a given landing site). At block 430, the method 400 includes, responsive to receiving the information indicative of the delay, determining an expected deviation from a landing schedule of the flight plan. For example, the landing schedule for one or more landing sites may change in accordance with the delay. At block 432, the method 400 includes updating a fuel value score of following landing sites of the flight plan based on the delay to reduce the expected deviation from the landing schedule of the flight plan. For example, the fuel value score may be adaptive based on relative weights associated with time for refueling and fuel-related costs. For example, when a delay occurs, shorter refueling times may be promoted to the detriment of fuel-related costs. At block 434, the method 400 includes updating the fueling plan corresponding to the flight plan based on updating the fuel value score.

Figure 8:
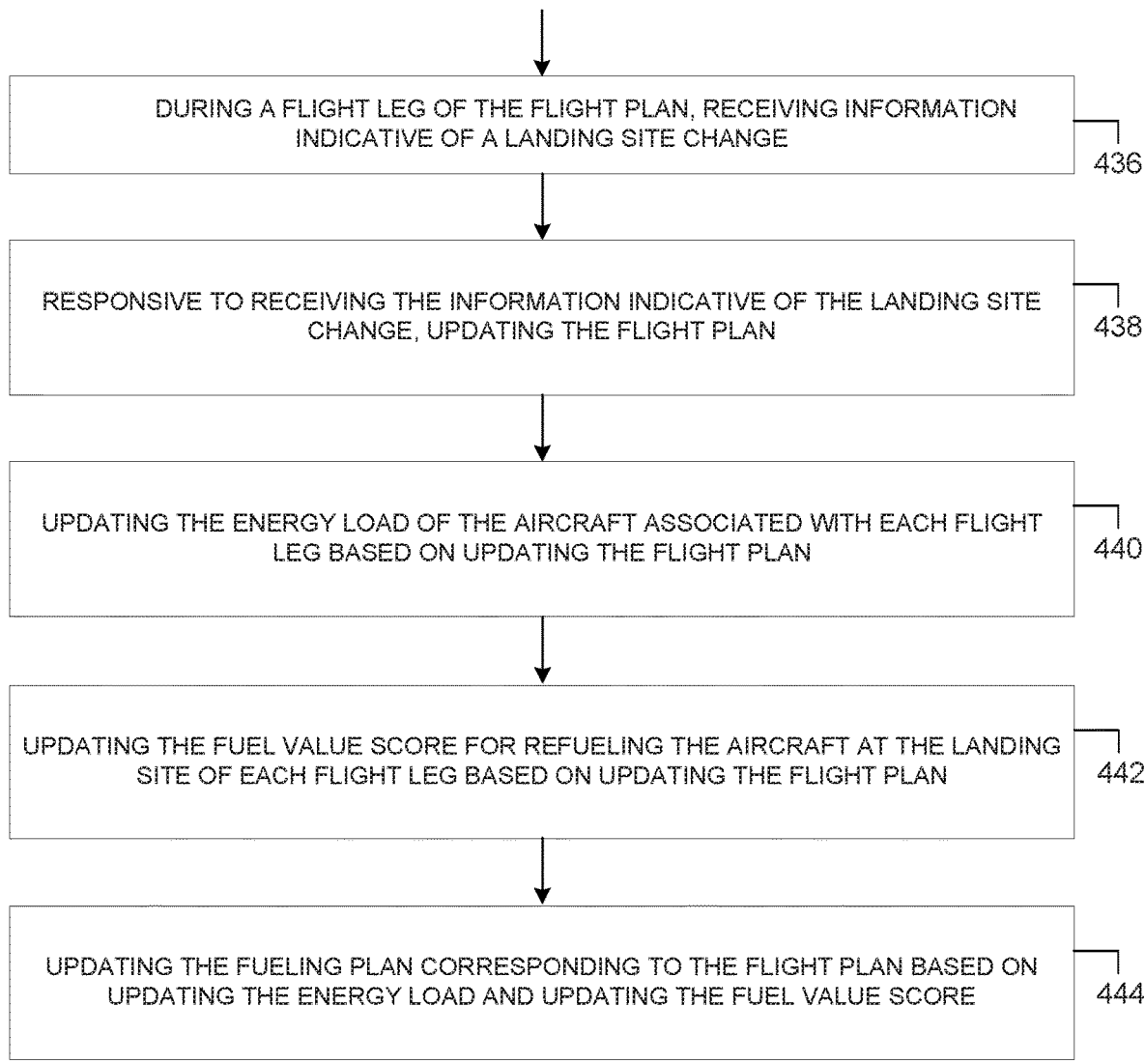
FIG. 8 illustrates a flowchart of a method for use with the method shown in FIG. 4, according to an example implementation.

FIG. 8 illustrates a flowchart of a method for use with the method shown in FIG. 4, according to an example implementation. In particular, FIG. 8 depicts the method 400 including block 436-444. At block 436, the method 400 includes, during a flight leg of the flight plan, receiving information indicative of a landing site change. For example, this may result from an in-flight condition that requires altering its course to a closer landing site or weather conditions may cause sufficient delay to warrant changing the flight plan. At block 438, the method 400 includes responsive to receiving the information indicative of the landing site change, updating the flight plan. At block 440, the method 400 includes updating the energy load of the aircraft associated with each flight leg based on updating the flight plan. For example, changing the course of the flight plan in this manner will result in one or more distance between landing sites will corresponding change with the landing site change and corresponding changes to landing times. At block 442, the method 400 includes updating the fuel value score for refueling the aircraft at the landing site of each flight leg based on updating the flight plan. For example, this may change based on fuel-related parameters from the landing site change and associated changes in timing to the flight plan. At block 444, the method 400 includes updating the fueling plan corresponding to the flight plan based on updating the energy load and updating the fuel value score.

Figure 9:
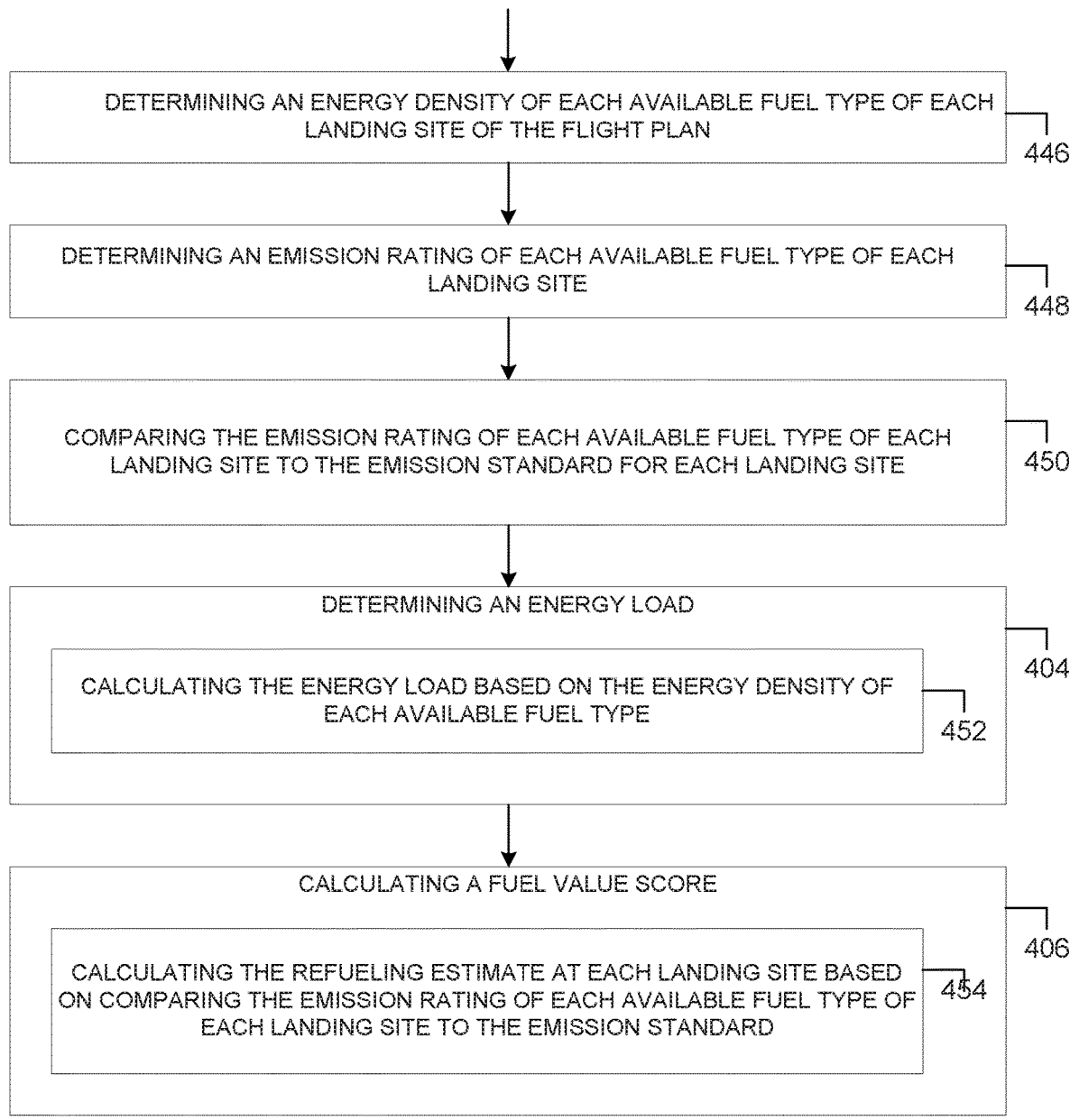
FIG. 9 illustrates a flowchart of a method for use with the method shown in FIG. 4, according to an example implementation.

FIG. 9 illustrates a flowchart of a method for use with the method shown in FIG. 4, according to an example implementation. In particular, FIG. 9 depicts the method 400 including block 446-454. Further, FIG. 9 depicts an example wherein the aircraft is configured for receiving different fuel types having corresponding energy densities. For example, some landing sites may have different fuel types available. At block 446, the method 400 includes determining an energy density of each available fuel type of each landing site of the flight plan. At block 448, the method 400 includes determining an emission rating of each available fuel type of each landing site. For example, some fuel types may correspond to higher carbon footprints than others. At block 450, the method 400 includes comparing the emission rating of each available fuel type of each landing site to the emission standard for each landing site. For example, different countries, regions, states, provinces, cities, etc. may have different emission ratings that set threshold emission levels (e.g., 3 liters per passenger per 100 km) that trigger taxes or fees and thus increase fuel-related costs. Block 452 is performed in accordance with block 404. At block 452, the method 400 includes calculating the energy load based on the energy density of each available fuel type. Block 454 is performed in accordance with block 406. At block 454, the method 400 includes calculating the refueling estimate at each landing site based on comparing the emission rating of each available fuel type of each landing site to the emission standard.

Figure 10:
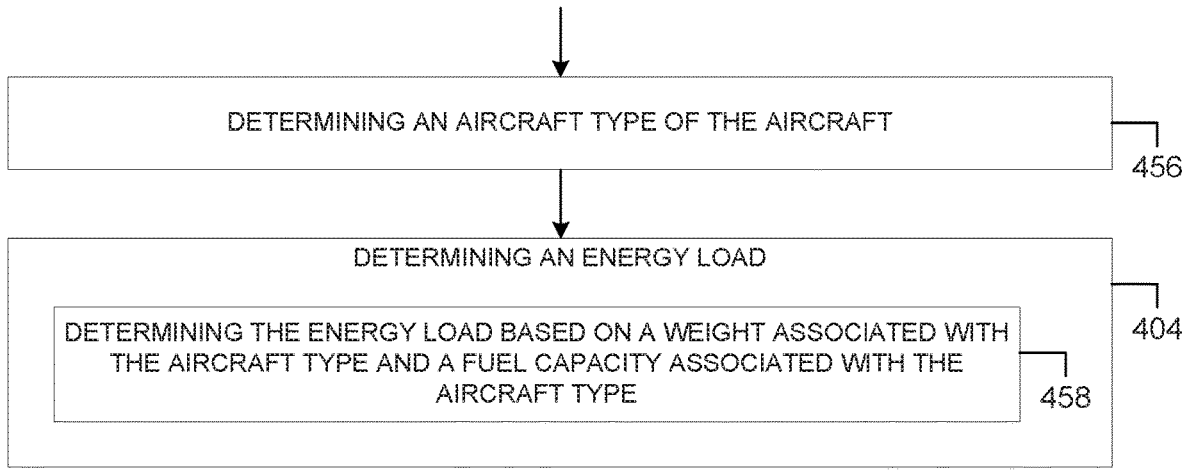
FIG. 10 illustrates a flowchart of a method for use with the method shown in FIG. 4, according to an example implementation.

FIG. 10 illustrates a flowchart of a method for use with the method shown in FIG. 4, according to an example implementation. In particular, FIG. 10 depicts the method 400 including blocks 456-458. Block 456 includes determining an aircraft type of the aircraft. Block 458 is performed in accordance with block 404. At block 458 includes determining the energy load based on a weight associated with the aircraft type and a fuel capacity associated with the aircraft type.

Figure 11:
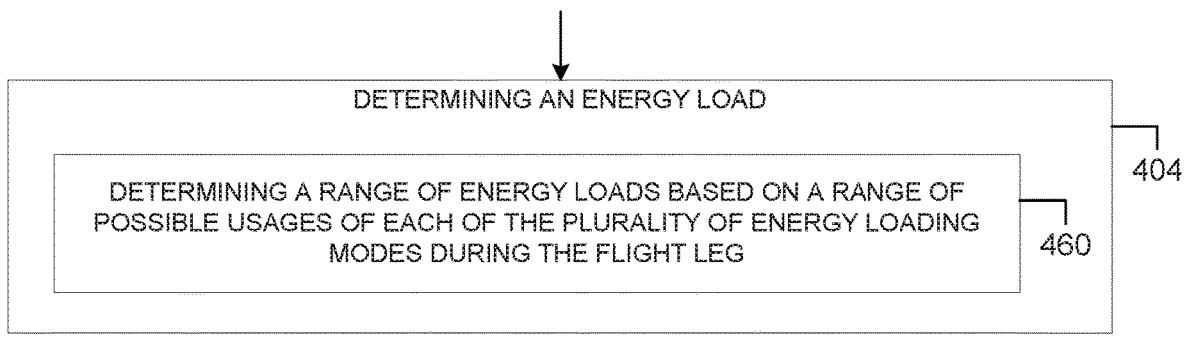
FIG. 11 illustrates a flowchart of a method for use with the method shown in FIG. 4, according to an example implementation.

FIG. 11 illustrates a flowchart of a method for use with the method shown in FIG. 4, according to an example implementation. In particular, FIG. 11 depicts the method 400 including block 460. Further, FIG. 11 shows an example wherein the aircraft has a hybrid propulsion system having a plurality of energy loading modes, and wherein the hybrid propulsion system is capable of switching energy loading modes during a flight leg. For example, the aircraft may operate using one or more liquid fuels (e.g., a bio-fuel) and one or more alternative fuels, such as a battery array. Block 460 is performed in accordance with block 404. At block 460, the method 400 determining a range of energy loads based on a range of possible usages of each of the plurality of energy loading modes during the flight leg. For example, the range of energy loads may take into account use of one fuel type and not the other, or alternating to some degree between each fuel type.

Figure 12:
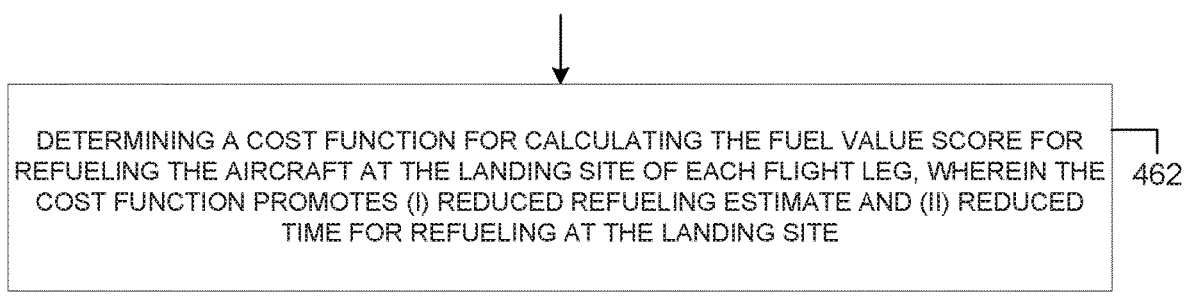
FIG. 12 illustrates a flowchart of a method for use with the method shown in FIGS. 4 and 11, according to an example implementation.

FIG. 12 illustrates a flowchart of a method for use with the method shown in FIGS. 4 and 11, according to an example implementation. In particular, FIG. 12 depicts the method 400 including block 462. At block 462, the method 400 includes determining a cost function for calculating the fuel value score for refueling the aircraft at the landing site of each flight leg, wherein the cost function promotes (i) reduced refueling estimate and (ii) reduced time for refueling at the landing site. For example, certain parameters, (e.g., as estimated fueling time) may be weighted differently than others. The cost function may result in a score that shows a relative desirability of one landing site for refueling over another based on parameter values associated with each landing site (e.g., values of the fuel-based parameters for each landing site).

Figure 13:
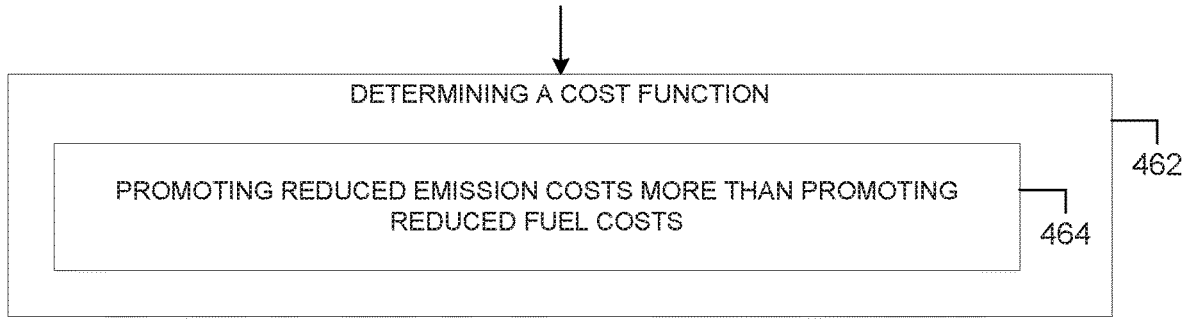
FIG. 13 illustrates a flowchart of a method for use with the method shown in FIG. 4, according to an example implementation.

FIG. 13 illustrates a flowchart of a method for use with the method shown in FIG. 4, according to an example implementation. In particular, FIG. 13 depicts the method 400 including block 464. Further, FIG. 13 shows an example wherein the refueling estimate comprises a cost of fuel and an emission cost comprising one or more of a tax, a toll, and a fee associated with emissions of the aircraft and associated with the landing site. For example, a rule or regulation of a jurisdiction of the landing site might set an emission standard resulting in the emission cost. Block 464 is performed in accordance with block 462. At block 464, the method 400 includes promoting reduced emission costs more than promoting reduced fuel costs. Promoting reduced emission costs in this manner may allow for more eco-friendly fueling plans across the fleet of aircraft. The resulting energy loading of the airline may reflect this by using more biofuels, eco-fuels, hybrid technology, and alternative fuels (e.g., batteries or other electricity-based propulsion systems).

Figure 14:
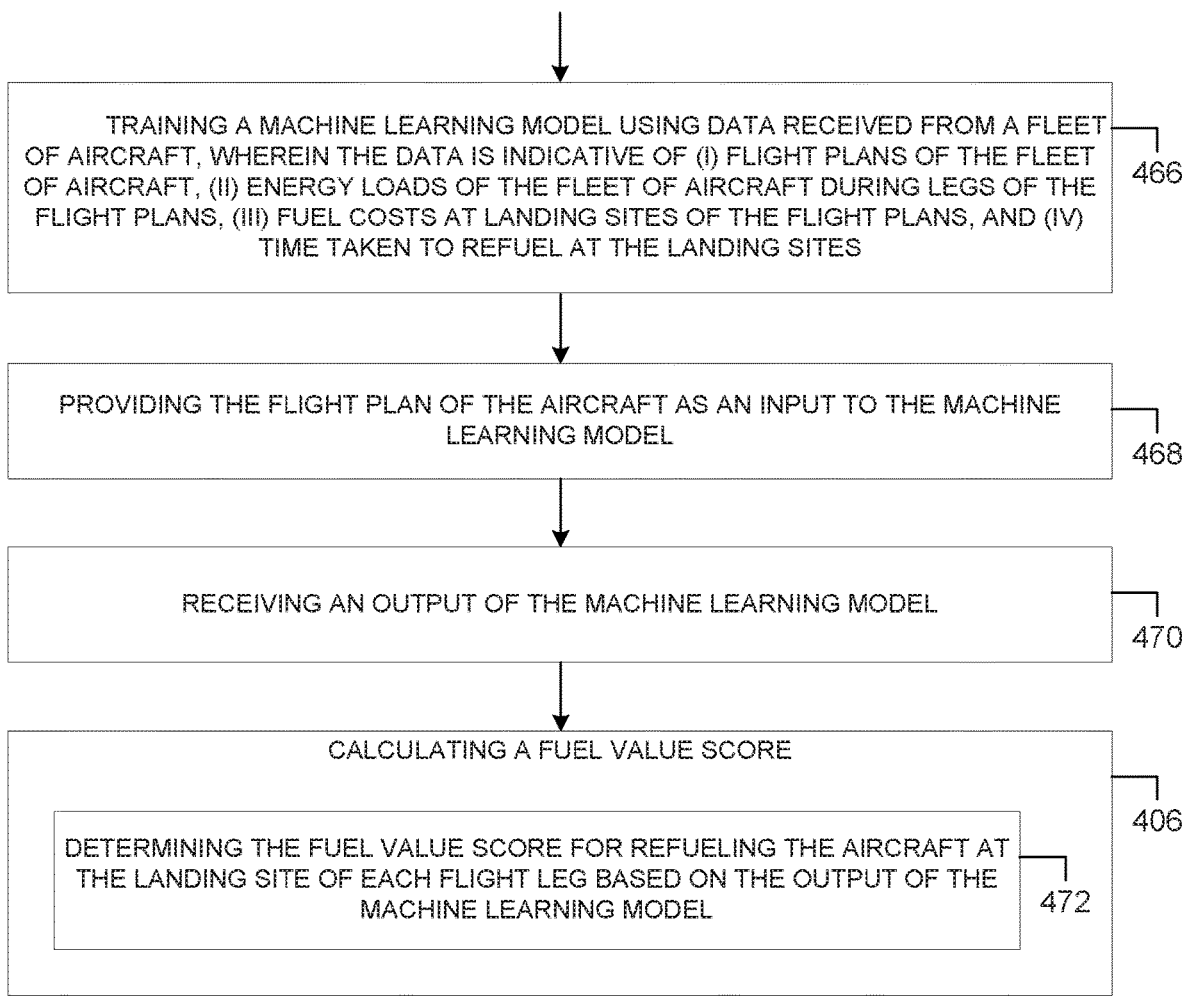
FIG. 14 illustrates a flowchart of a method for use with the method shown in FIG. 4, according to an example implementation.

FIG. 14 illustrates a flowchart of a method for use with the method shown in FIG. 4, according to an example implementation. In particular, FIG. 14 depicts the method 400 including blocks 466-472. At block 466, the method 400 includes training a machine learning model using data received from a fleet of aircraft, wherein the data is indicative of (i) flight plans of the fleet of aircraft, (ii) energy loads of the fleet of aircraft during legs of the flight plans, (iii) fuel costs at landing sites of the flight plans, and (iv) time taken to refuel at the landing sites. This may include various parameter values described above, and may also involve receiving data from other sources, such as computing devices associated with various landing sites. At block 468, the method 400 includes providing the flight plan of the aircraft as an input to the machine learning model. At block 470, the method 400 includes receiving an output of the machine learning model. Block 472 is performed in accordance with block 406. At block 472, the method 400 includes determining the fuel value score for refueling the aircraft at the landing site of each flight leg based on the output of the machine learning model. In additional examples, a machine learning model may be similarly implemented to determine the fueling plan by using past energy loads and fuel values scores as training data, and using a current energy load and fuel value score as an input.

Figure 15:
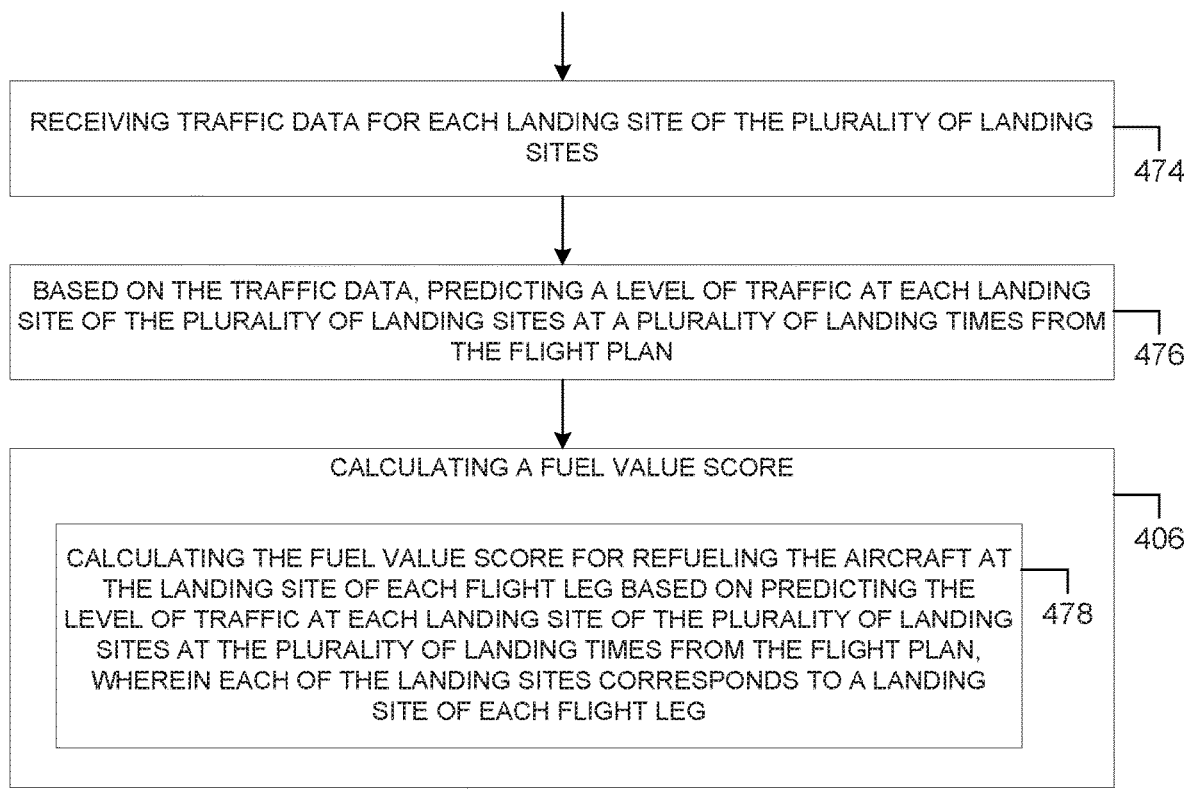
FIG. 15 illustrates a flowchart of a method for use with the method shown in FIG. 4, according to an example implementation.

FIG. 15 illustrates a flowchart of a method for use with the method shown in FIG. 4, according to an example implementation. In particular, FIG. 15 depicts the method 400 including blocks 474-478. At block 474, the method 400 includes receiving traffic data for each landing site of the plurality of landing sites. Traffic data may correspond to holding data or taxiing data for a plurality of aircraft at an airport. At block 476, the method 400 includes, based on the traffic data, predicting a level of traffic at each landing site of the plurality of landing sites at a plurality of landing times from the flight plan. For example, the traffic data may delay the flight plan at a first landing site, which potentially changes the predicted traffic level at later landing sites because traffic levels change depending on the time of day. Block 478 is performed in accordance with FIG. 406. At block 478, the method 400 includes calculating the fuel value score for refueling the aircraft at the landing site of each flight leg based on predicting the level of traffic at each landing site of the plurality of landing sites at the plurality of landing times from the flight plan, wherein each of the landing sites corresponds to a landing site of each flight leg. In this manner, determining a change in traffic at a given landing site may alter the fueling plan.

In further examples relating to a plurality of aircraft (e.g., a fleet of aircraft), a database may include sets of fuel-related parameters corresponding to each landing site in a network of landing sites associated with the fleet of aircraft. In these examples, the method 400 further includes receiving the set of fuel-related parameters corresponding to each landing site of the plurality of landing sites from the database of sets of fuel-related parameters.

In further examples relating to the plurality of aircraft, the method 400 may include receiving, from an aircraft of the plurality of aircraft, information indicative of a change in at least one parameter value of a set of fuel-related parameters for a particular landing site. The method may include, responsive to receiving the information indicative of the change in at least one parameter value, updating the database of sets of fuel-related parameters, and determining a subset of the plurality of aircraft having flight plans that include the particular landing site. The method 400 may further include updating the energy load for each aircraft in the subset of plurality of aircraft. The method may further include updating the fuel value score for the particular landing site. The method 400 may further include updating fueling plans for the subset of the plurality of aircraft.

In further examples relating to the plurality aircraft, each aircraft of the plurality of aircraft is configured to provide information indicative of operational delays associated with landing sites. In these examples, the method 400 includes receiving the data indicative of operational delays of one or more landing sites from the plurality of aircraft. In these examples, calculating the fuel value score for refueling the aircraft at the landing site of each flight leg includes calculating the fuel value score for refueling the aircraft at the landing site of each flight leg based on the data from the plurality of aircraft.

In further examples relating to the plurality of aircraft, plurality of aircraft are associated with a plurality of aircraft types, wherein each aircraft type is associated with a different propulsion system. In these examples, the method 400 includes determining the aircraft type for each aircraft of the plurality of aircraft, wherein determining the energy load for each aircraft of the plurality of aircraft comprises determining the energy load based on determining the aircraft type for each aircraft of the plurality of aircraft.

The systems and methods are beneficial to remove problems associated with optimizing energy loads in a fleet of aircraft in the presence of consistently-changing flight conditions and operational conditions. These systems and methods allow for adaptive fueling plans that promote both efficient operations and reduced emissions. Further, the embodiments described herein contemplate ongoing developments in airline technology, such as hybrid technology and alternative fuels. In this manner, an airline can effectively manage a fleet of aircraft using diverse fuel sources.

Implementations of this disclosure provide technological improvements that are particular to computer technology, for example, those concerning analysis of large-scale, flight-related data having thousands of parameters. Computer-specific technological problems, such as enabling such data to be analyzed in a consistent and effective manner while parameter values across the system continue to change, can be wholly or partially solved by implementations of this disclosure. For example, implementation of this disclosure allows for such data received from many different computing devices to be used for determining and altering refueling plans automatically, rather than using manual inspection. Further, to the extend such manual inspection and interaction exists, such inputs are tracked and applied to the system at large (e.g., interacting with one fueling plan may influence others, as described above), allowing for later iterations to provide improved fueling plans.

The systems and methods of the present disclosure further address problems particular to computer networks, for example, those concerning the processing of data received from a fleet of aircraft, from NOTAM resources, from airport traffic networks, and the like. These computing network-specific issues can be solved by implementations of the present disclosure. For example, by using a single controller to consider data across a fleet of aircraft, parameters commonly experienced by different aircraft may be addressed at once, and data can be corroborated by multiple sources in real time. This increases accuracy levels due to receiving related data from multiple sources. The implementations of the present disclosure thus introduce new and efficient improvements in the ways in which data systems, such as databases, can be applied to data in the airline context to improve a speed and/or efficiency of one or more processor-based systems configured to support or utilize the databases for efficient control of airline operations.

Refueling plans determined according to the implementations described herein also contribute to the implementation of emission-saving technologies, and allow for an airline to use many different fuel types and aircraft types within an operational context. This is beneficial because fuel development, hybrid technologies, and alternative fuel sources are being developed rapidly, and assimilating them into an airline quickly allows for rapid adoption of these environmentally friendly technologies. Implementations of this disclosure can thus introduce new and efficient improvements in the ways in which emission-reducing technology is used in relation to a fleet of aircraft.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for optimizing energy loading in commercial airline operations comprising:
   receiving a flight plan of an aircraft indicative of a plurality of landing sites and a corresponding plurality of flight legs, wherein each landing site corresponds to a set of jet fuel-related parameters, and wherein each set of jet fuel-related parameters comprises at least (i) a landing site location, (ii) an available jet fuel type, (iii) an expected jet fuel cost, and (iv) an emission standard, wherein the aircraft is a commercial aircraft;
   determining, based on (i) the set of jet fuel-related parameters for each landing site and (ii) an expected payload for each flight leg, an energy load of the aircraft associated with each flight leg, wherein the energy load corresponds to an amount of fuel used during the flight leg;

training a machine learning model using data received from a fleet of aircraft that implemented past fueling plans generated by the machine learning model, wherein the data is indicative of (i) flight plans of the fleet of aircraft, (ii) energy loads of the fleet of aircraft during legs of the flight plans, (iii) jet fuel costs at landing sites of the flight plans, and (iv) time taken to refuel at the landing sites, wherein the fleet of aircraft is a fleet of commercial aircraft, wherein training the machine learning model using the data comprises training the machine learning model to calculate a fuel value score, wherein training the machine learning model comprises a computing device automatically updating the machine learning model using data indicative of times that the aircraft waits on the ground at the landing sites waiting for refueling to begin;

calculating, using the trained machine learning model and the flight plan of the aircraft, the fuel value score for refueling the aircraft at a landing site of each flight leg, wherein the fuel value score relates to a fuel amount and associated emissions cost at the landing site and a time for refueling at the landing site;

determining a fueling plan corresponding to the flight plan based at least on the energy load of the aircraft at each flight leg of the flight plan and the fuel value score for refueling the aircraft at the landing site of each flight leg of the flight plan; and fueling the aircraft with jet fuel by a particular amount at a first landing site of the flight plan in accordance with the fueling plan.

2. The method of claim 1, further comprising:
receiving a plurality of flight plans for a fleet of aircraft;
determining fueling plans corresponding to each of the flight plans;
receiving information indicative of altered sets of jet fuel-related parameters corresponding to a plurality of landing sites from a plurality of aircraft in the fleet; and
altering the plurality of fueling plans, including the fueling plan of the aircraft, in accordance with the altered sets of jet fuel-related parameters corresponding to the plurality of landing sites.

3. The method of claim 1, further comprising:
during a flight leg of the flight plan, receiving information indicative of a notice to airmen (NOTAM) related to a landing site of the flight plan, wherein the NOTAM indicates at least (i) an increased energy load during the flight leg and (ii) an increased time for refueling at the landing site;
updating the energy load of the flight leg based on the NOTAM;
updating the fuel value score of the landing site based on the NOTAM; and
updating the fueling plan corresponding to the flight plan based on updating the energy load and updating the fuel value score.

4. The method of claim 1, further comprising:
during a flight leg of the flight plan, receiving information indicative of a delay;
responsive to receiving the information indicative of the delay, determining an expected deviation from a landing schedule of the flight plan;
updating a fuel value score of following landing sites of the flight plan based on the delay to reduce the expected deviation from the landing schedule of the flight plan; and
updating the fueling plan corresponding to the flight plan based on updating the fuel value score.

5. The method of claim 1, further comprising:
during a flight leg of the flight plan, receiving information indicative of a landing site change;
responsive to receiving the information indicative of the landing site change, updating the flight plan;
updating the energy load of the aircraft associated with each flight leg based on updating the flight plan;
updating the fuel value score for refueling the aircraft at the landing site of each flight leg based on updating the flight plan; and
updating the fueling plan corresponding to the flight plan based on updating the energy load and updating the fuel value score.

6. The method of claim 1, wherein the aircraft is configured for receiving different jet fuel types having corresponding energy densities, the method further comprising:
determining an energy density of each available jet fuel type of each landing site of the flight plan;
determining an emission rating of each available jet fuel type of each landing site; and
comparing the emission rating of each available jet fuel type of each landing site to the emission standard for each landing site,
wherein calculating the energy load for each flight leg comprises calculating the energy load based on the energy density of each available jet fuel type, and
wherein calculating the fuel value score comprises calculating the fuel amount and associated emissions cost at each landing site based on comparing the emission rating of each available jet fuel type of each landing site to the emission standard.

7. The method of claim 1, further comprising:
determining an aircraft type of the aircraft, wherein determining the energy load comprises determining the energy load based on a weight associated with the aircraft type and a fuel capacity associated with the aircraft type.

8. The method of claim 1, wherein the aircraft has a hybrid propulsion system comprising a plurality of energy loading modes, wherein the hybrid propulsion system is capable of switching energy loading modes during a flight leg, and wherein determining the energy load comprises determining a range of energy loads based on a range of possible usages of each of the plurality of energy loading modes during the flight leg.

9. The method of claim 1, further comprising:
determining a cost function for calculating the fuel value score for refueling the aircraft at the landing site of each flight leg, wherein the cost function promotes (i) a reduced fuel amount and associated emissions cost and (ii) reduced time for refueling at the landing site.

10. The method of claim 9, wherein the fuel amount and associated emissions cost comprises a cost of fuel and one or more of a tax, a toll, and a fee associated with emissions of the aircraft and associated with the landing site, and wherein determining the cost function for calculating the fuel value score comprises promoting reduced emission costs more than promoting reduced jet fuel costs.

11. The method of claim 1, further comprising
receiving traffic data for each landing site of the plurality of landing sites; and
based on the traffic data, predicting a level of traffic at each landing site of the plurality of landing sites at a plurality of landing times from the flight plan,
wherein calculating the fuel value score for refueling the aircraft at the landing site of each flight leg comprises calculating the fuel value score for refueling the aircraft at the landing site of each flight leg based on predicting the level of traffic at each landing site of the plurality of landing sites at the plurality of landing times from the flight plan, wherein each of the landing sites corresponds to a landing site of each flight leg.

12. The method of claim 1, wherein calculating the fuel value score comprises calculating the fuel value score such that the fuel value score is indicative of a time for the aircraft waiting on the ground at the landing site waiting for refueling to begin.

13. A system for optimizing energy loading in commercial airline operations comprising:
a computing device comprising a processor and a memory having instructions executable by the processor to perform a set of functions, the set of functions comprising:
receiving flight plans of a plurality of aircraft in a fleet of aircraft, wherein each flight plan is indicative of a plurality of landing sites and a corresponding plurality of flight legs, wherein each landing site corresponds to a set of jet fuel-related parameters, and wherein each set of jet fuel-related parameters comprises at least (i) a landing site location, (ii) an available jet fuel type, (iii) an expected jet fuel cost, and (iv) an emission standard, wherein the fleet of aircraft is a fleet of commercial aircraft; and
for each aircraft of the plurality of aircraft:
determining, based on (i) the set of jet fuel-related parameters for each landing site and (ii) an expected payload for each flight leg, an energy load of the aircraft associated with each flight leg, wherein the energy load corresponds to an amount of fuel used during the flight leg;
calculating a fuel value score for refueling the aircraft at a landing site of each flight leg, wherein the fuel value score relates to a fuel amount and associated emissions cost at the landing site and a time for refueling at the landing site;
determining a fueling plan corresponding to the flight plan based at least on the energy load of the aircraft at each flight leg of the flight plan and the fuel value score for refueling the aircraft with jet fuel at the landing site of each flight leg of the flight plan; and
providing the fueling plan to the aircraft, the system further comprising:
a machine learning device, wherein the machine learning device includes a machine learning model automatically trained and updated by the machine learning device using data received from the fleet of aircraft that implemented past fueling plans generated by the machine learning model, wherein the data is indicative of (i) flight plans of the fleet of aircraft, (ii) energy loads of the fleet of aircraft during legs of the flight plans, (iii) jet fuel costs at landing sites of the flight plans, (iv) time taken to refuel at the landing sites, and (v) times that the aircraft waits on the ground at the landing sites waiting for refueling to begin, wherein the machine learning model is trained using the data to calculate the fuel value score, wherein calculating the fuel value score comprises calculating the fuel value score using the trained machine learning model and the flight plan of the aircraft.

14. The system of claim 13, further comprising a database of sets of jet fuel-related parameters corresponding to each landing site in a network of landing sites associated with the fleet of aircraft, wherein the set of functions further comprises receiving the set of jet fuel-related parameters corresponding to each landing site of the plurality of landing sites from the database of sets of jet fuel-related parameters.

15. The system of claim 14, wherein the set of functions further comprises, receiving, from an aircraft of the plurality of aircraft, information indicative of a change in at least one parameter value of a set of jet fuel-related parameters for a particular landing site; and
responsive to receiving the information indicative of the change in at least one parameter value,
updating the database of sets of jet fuel-related parameters, and
determining a subset of the plurality of aircraft having flight plans that include the particular landing site;
updating the energy load for each aircraft in the subset of the plurality of aircraft;
updating the fuel value score for the particular landing site; and
updating fueling plans for the subset of the plurality of aircraft.

16. The system of claim 13, wherein each aircraft of the plurality of aircraft is configured to provide the computing device with information indicative of operational delays associated with landing sites, wherein the set of functions further comprises:
receiving data indicative of operational delays of one or more landing sites from the plurality of aircraft,
wherein calculating the fuel value score for refueling the aircraft at the landing site of each flight leg comprises calculating the fuel value score for refueling the aircraft at the landing site of each flight leg based on the data from the plurality of aircraft.

17. The system of claim 13, wherein the plurality of aircraft are associated with a plurality of aircraft types, wherein each aircraft type is associated with a different propulsion system, wherein the set of functions further comprises determining the aircraft type for each aircraft of the plurality of aircraft, and wherein determining the energy load for each aircraft of the plurality of aircraft comprises determining the energy load based on determining the aircraft type for each aircraft of the plurality of aircraft.

18. A non-transitory computer readable medium having stored thereon instructions, that when executed by one or more processors of a computing device, cause the computing device to perform functions comprising:
receiving a flight plan of an aircraft indicative of a plurality of landing sites and a corresponding plurality of flight legs, wherein each landing site corresponds to a set of jet fuel-related parameters, and wherein each set of jet fuel-related parameters comprises at least (i) a landing site location, (ii) an available jet fuel type, (iii) an expected jet fuel cost, and (iv) an emission standard, wherein the aircraft is a commercial aircraft;
determining, based on (i) the set of jet fuel-related parameters for each landing site and (ii) an expected payload for each flight leg, an energy load of the aircraft associated with each flight leg, wherein the energy load corresponds to an amount of fuel used during the flight leg;
training a machine learning model using data received from a fleet of aircraft that implemented past fueling plans generated by the machine learning model, wherein the data is indicative of (i) flight plans of the fleet of aircraft, (ii) energy loads of the fleet of aircraft during legs of the flight plans, (iii) jet fuel costs at landing sites of the flight plans, and (iv) time taken to refuel at the landing sites, wherein the fleet of aircraft is a fleet of commercial aircraft, wherein training the machine learning model using the data comprises training the machine learning model to calculate a fuel value score, wherein training the machine learning model comprises the computing device automatically updating the machine learning model using data indicative of times that the aircraft waits on the ground at the landing sites waiting for refueling to begin;

calculating, using the trained machine learning model and the flight plan of the aircraft, the fuel value score for refueling the aircraft at a landing site of each flight leg, wherein the fuel value score relates to a fuel amount and associated emissions cost at the landing site and a time for refueling at the landing site;

determining a fueling plan corresponding to the flight plan based at least on the energy load of the aircraft at each flight leg of the flight plan and the fuel value score for refueling the aircraft at the landing site of each flight leg of the flight plan; and fueling the aircraft with jet fuel by a particular amount at a first landing site of the flight plan in accordance with the fueling plan.

19. The non-transitory computer readable medium of claim 18, the functions further comprising:

receiving a plurality of flight plans for a fleet of aircraft;

determining a plurality of fueling plans corresponding to each of the flight plans;

receiving information indicative of altered sets of jet fuel-related parameters corresponding to a plurality of landing sites from a plurality of aircraft in the fleet; and altering the plurality of fueling plans, including the fueling plan of the aircraft, in accordance with the altered sets of jet fuel-related parameters corresponding to the plurality of landing sites.

20. The non-transitory computer readable medium of claim 18, wherein calculating the fuel value score comprises calculating the fuel value score such that the fuel value score is indicative of a time for the aircraft waiting on the ground at the landing site waiting for refueling to begin.

* * * * *